Jan. 11, 1949.　　　　G. B. PALMER　　　　2,458,915
MATERIAL HANDLING APPARATUS
Filed Aug. 31, 1945　　　　3 Sheets-Sheet 2
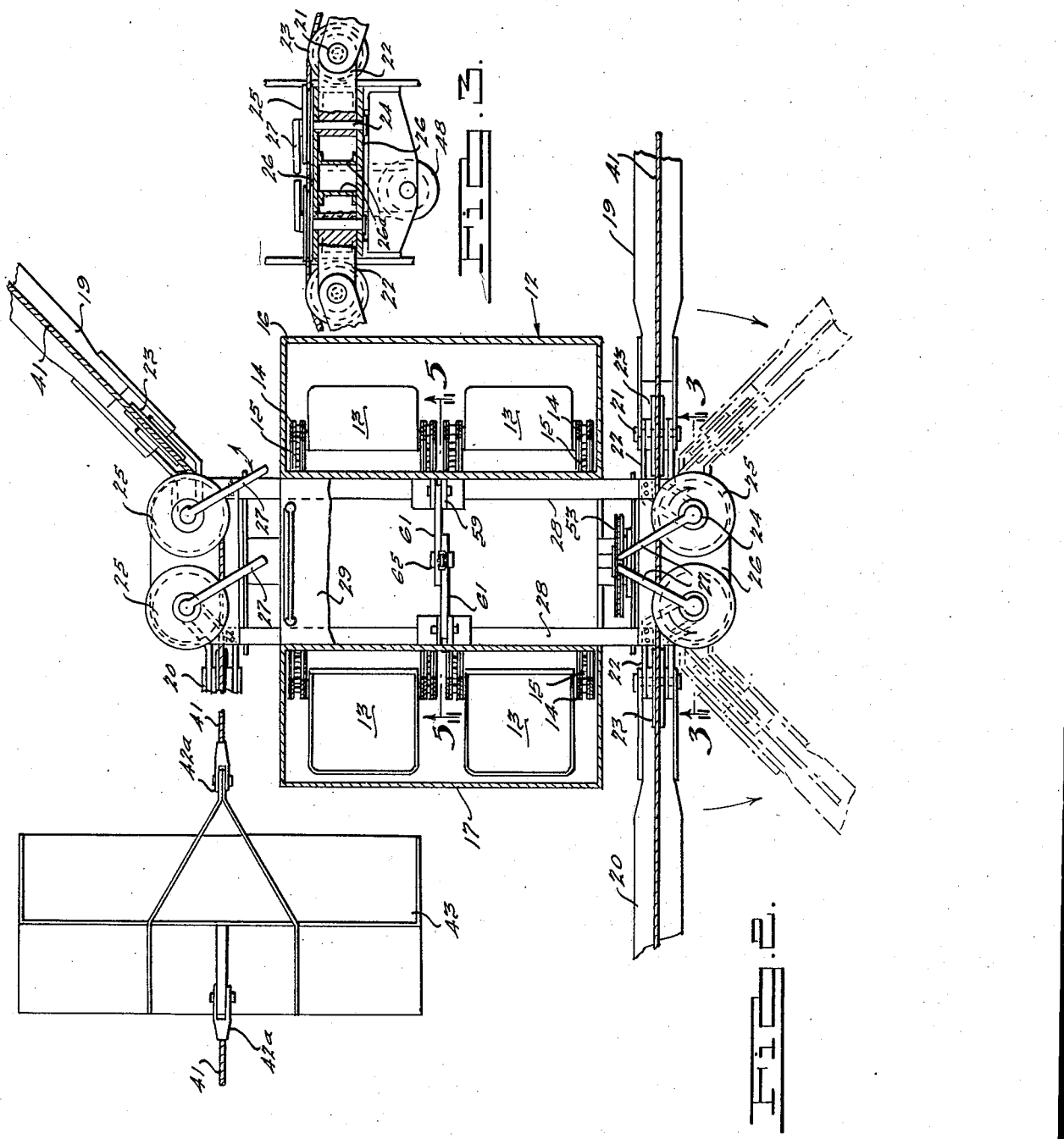
INVENTOR.
George B. Palmer
BY
Gray & Smith
ATTORNEYS.

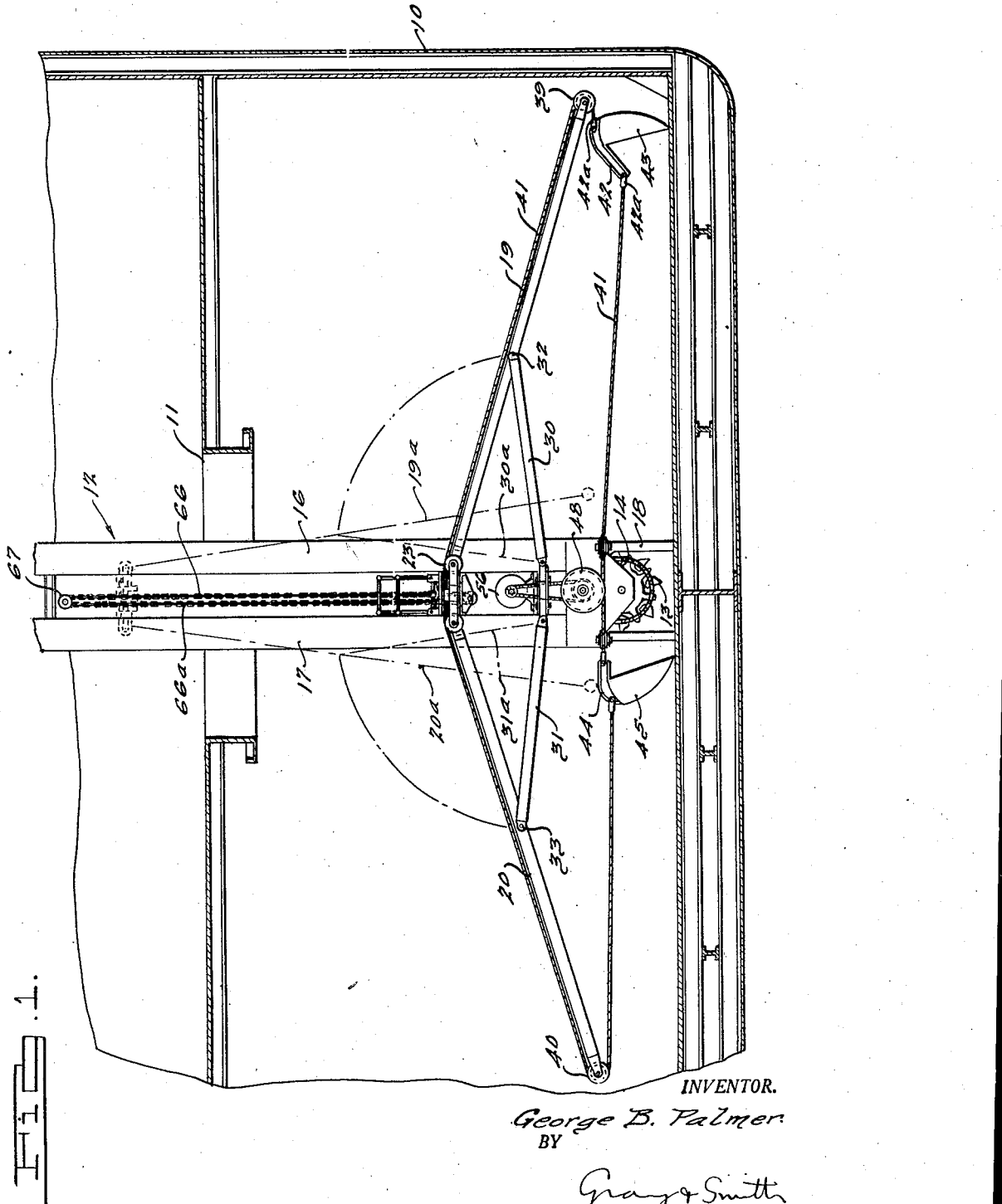

Jan. 11, 1949.  G. B. PALMER  2,458,915
MATERIAL HANDLING APPARATUS
Filed Aug. 31, 1945  3 Sheets-Sheet 3

INVENTOR.
George B. Palmer.
BY
Gray & Smith
ATTORNEYS.

Patented Jan. 11, 1949

2,458,915

UNITED STATES PATENT OFFICE 2,458,915

MATERIAL HANDLING APPARATUS

George Bruce Palmer, Grosse Isle, Mich.

Application August 31, 1945, Serial No. 613,829

22 Claims. (Cl. 214—93)

This invention relates to apparatus for handling bulk materials, such as ore, bauxite, sand, crushed stone, gravel, copra, coal, grain, salt, raw sugar and the like, and especially to an improved apparatus particularly adapted for removing, unloading or discharging bulk materials from various sources such as bins, pits, containers, cargo holds of barges and ships, railway cars and stock piles.

Although the present apparatus is especially useful for moving bulk materials by scraper devices from a pile to a given locality and thence conveying the materials by bucket elevator to an elevated point whence the material is conveyed to destination, it will be understood that the scraper devices and associated mechanism may be utilized to move the material to a horizontally movable conveyor located beneath the level of the pile of material and fed through a hatch opening or the like.

In handling materials of the above character it has been common to employ elevators of the bucket type suitably supported and adapted to be lowered into a material holding bin or pit, and be moved therein in order to remove all the material contained in such bin or pit. It has been found in the process of unloading such materials that the material ceases to flow after the angle of repose is reached and that the elevator or conveyor buckets or flights will only partially fill unless they are surcharged to some distance above the top of said buckets or flights. This has usually in past practice necessitated moving the material from the pile by hand shovelling towards the receiving end of the elevator or conveyor, resulting in hazards to the workmen as well as involving considerable labor expense. Numerous attempts have been made by others to provide mechanical means for moving or drawing the material toward the receiving end of the elevator or conveyor so as to increase the area served thereby. These have, so far as I am aware, been proved impractical or inefficient and have had many disadvantages. In one such type of construction proposed for the purpose of discharging grain four scrapers are used, each of them requiring a special attendant for drawing it back from the elevator and guiding it. The fifth man is required at the elevator control to operate the winch for hauling the scrapers. Because of the difficulty of working amongst the cargo the scraper attendants have to be frequently relieved and, therefore, nine men working in relays are usually required to operate one elevator at the rate of only about thirty percent of its full discharge capacity.

An object of the invention is to improve upon apparatus and methods heretofore used in unloading, removing or discharging bulk materials and by so doing to provide an improved apparatus which will be more efficient and economical in operation, compact and relatively simple in construction, capable of serving substantially the entire area surrounding the receiving point of the elevator or conveyor and of being operated by a single attendant or operator, and hence being susceptible of extensive application or adaptability to the unloading or handling of bulk materials in many fields and under a wide range of conditions.

Another object of the invention is to provide a material handling device of the following character having improved means for drawing the material toward the receiving end of the elevator or conveyor at a rate ensuring continuous operation of the elevator or conveyor at substantially its full discharge capacity.

A still further object of the invention is to provide a novel and improved material handling apparatus having a plurality of arms or booms adapted to project outwardly from a tower or frame structure, such as a bucket elevator, which may be raised and lowered with respect to the pile of material, and in which scrapers are carried by the arms or booms and shifted outwardly and inwardly between the ends of the arms or booms and the receiving point of the conveyor or boot of the elevator by cable mechanism controlled and operated in improved and efficient manner.

Another object of the invention is to provide an apparatus of the foregoing description in which the arms or booms may be collapsed to positions along the sides of the tower or elevator so as to permit the same to be shifted vertically into and out of relatively small openings, such as the hatch of a cargo ship or vessel.

A further object of the invention is to provide an improved apparatus in which the outwardly projecting booms over which the scraper operating cables extend may be raised and lowered at will with respect to the boot of the elevator or tower and also may be swung horizontally relatively thereto so as to serve the entire area around the elevator or tower.

Also it is an object of the invention to operate the two scrapers carried by a pair of oppositely extending booms or arms through the medium of a single cable and drum mechanism and in such manner that one scraper will be dragged inwardly toward the receiving end of the conveyor or elevator as the other scraper is dragged outwardly away from this point. As a consequence of this improvement not only is the operating mechanism simplified and subjected to less strain but also the feed of the material to the elevator or conveyor is rendered more uniform so as to accommodate the capacity thereof.

Other objects of this invention will appear in the following description and appended claims, reference being had to the accompanying drawings forming a part of this specification wherein like reference characters designate corresponding parts in the several views.

Fig. 1 is a side elevation, in part diagrammatical, of a material handling apparatus constructed in accordance with one embodiment of the present invention and utilizing an elevator conveyor which in this view is shown lowered into the cargo hold of a vessel.

Fig. 2 is an enlarged fragmentary sectional plan view taken substantially through lines 2—2 of Fig. 4 looking in the direction of the arrows.

Fig. 3 is a fragmentary section taken substantially through lines 3—3 of Fig. 2 looking in the direction of the arrows.

Figure 4:
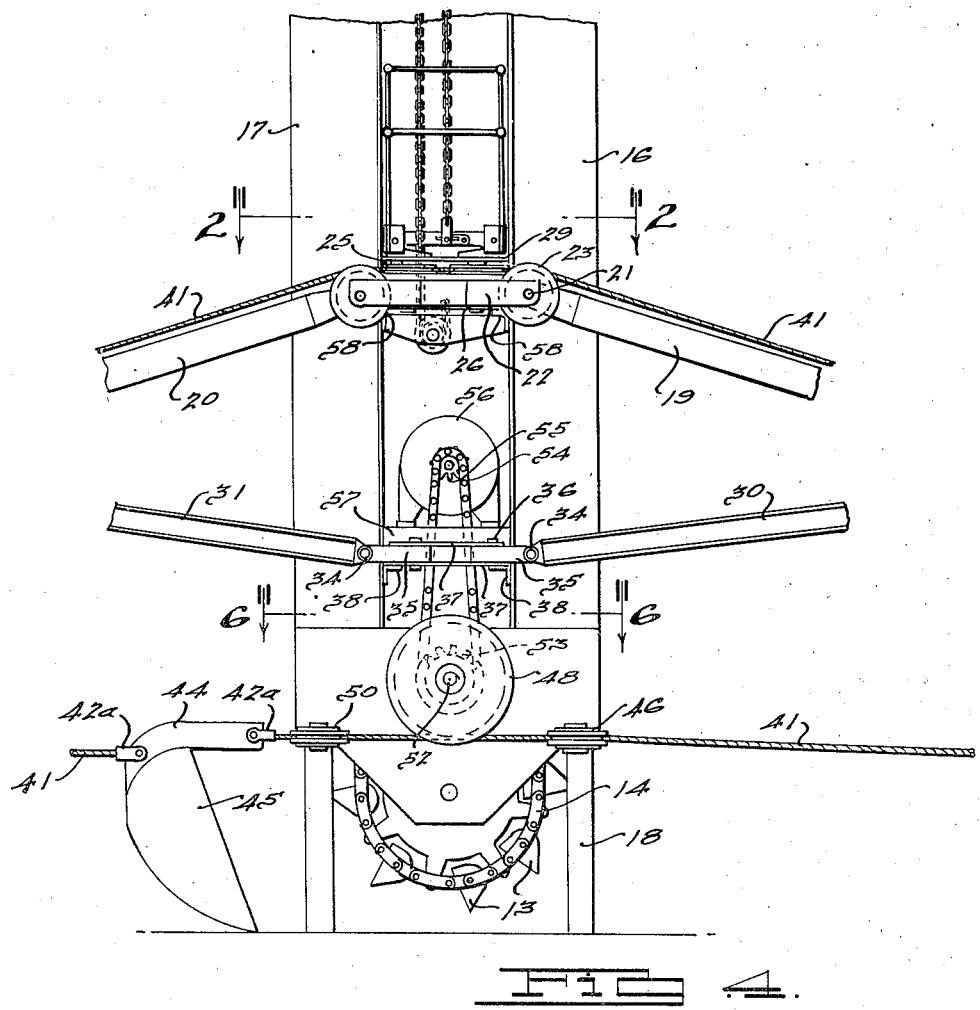
Fig. 4 is an enlarged fragmentary side elevation, in part similar to Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the present invention as applied to an apparatus designed and constructed for the purpose of unloading bulk material from the cargo hold of a vessel 10 having a hatch opening 11. In the present instance the frame or tower structure of the apparatus is in the form of a material raising elevator 12 suspended from a boom or booms outside the vessel which carry mechanism by means of which the elevator may be lowered through the hatch opening 11 into the hold of the vessel or withdrawn therefrom. The supporting boom mechanism for the elevator 12 may be similar to that shown and described in my copending application, Serial No. 566,858 filed December 6, 1944, now Patent No. 2,425,342, granted August 12, 1947.

The elevator 12 may be of the conventional bucket type comprising a succession of buckets 13 carried by endless chains 14 passing over sprockets 15 and suitably guided for vertical travel through spaced vertically extending housings 16 and 17. These housings provide portions of the supporting framework of the elevator and have their lower ends open at the boot of the elevator to permit the bucket and chain mechanism to travel downwardly through the open end of housing 16 and thence upwardly through the adjacent housing 17. Depending from the lower ends of the housings are legs 18 which by bottoming against the floor of the hold will determine the limit to which the elevator may be lowered thereinto.

The scraper supporting means in the present embodiment comprise a pair of companion booms or arms 19 and 20 arranged at each side of the elevator, see Fig. 2, and since each pair of booms together with their associated cable and scraper mechanism is the same at each side of the elevator, a description of one will suffice. Each boom 19 and 20 is pivotally connected at its inner end through the medium of a horizontal shaft 21 to a bracket 22, whereby the boom is capable of swinging in a vertical direction about a horizontal axis formed by the shaft or pivot 21. The adjacent ends of each boom and bracket 22 are bifurcated and overlapped, as shown in Fig. 2, and revolubly mounted on the shaft 21 between these bifurcated ends is a vertical grooved guide pulley or sheave 23. Each bracket 22 as shown in Fig. 2 has an angularly extending inner portion and the inner end of this portion is rigidly secured to a vertical shaft 24 which carries at its upper end a freely rotatable horizontal grooved guide pulley or sheave 25. It will be noted that the two pulleys 23 and 25 adjacent the inner end of each boom 19 and 20 are arranged relatively close together and that the pulley 23 lies in a vertical plane extending tangential to the inner peripheral portion of the horizontal pulley 25. The vertical shaft 24 which carries the pulley 25 is suitably mounted in a cross-head comprising vertically spaced horizontal plates 26 riveted to the upper and lower inwardly directed flanges of a pair of transverse frame members or channels 28 rigidly secured to the inner vertical walls of the housings 16, 17. These channels extend outwardly of the housings and the supporting plates in turn project outwardly of the ends of the channels so as to receive the brackets 22 therebetween and permit free swinging motion of the brackets between the plates. The latter may be stiffened by means of intervening channel members 26a. An operator's platform 29 is supported on the frame members 28. Fast to the upper end of each shaft 24 is a handle 27 which extends within reach of the operator standing on the platform and which may be swung laterally in one direction or the other to turn the shaft 24 and swing the bracket 22 and attached boom 19 or 20 angularly as shown in dotted lines in Fig. 2. Suitable means, not shown, may be provided for holding the shaft 24 and bracket 22 in any angularly adjusted position. Inasmuch as the bracket 22 swings about the axis of the pulley 25, it will be apparent that in every angular position of the bracket and attached boom the grooved pulley 23 will remain in tangential relation to the pulley 25. Furthermore, it will be noted that the associated pulleys 25 at each side of the elevator lie coplanar and side by side so that the operating cable, as hereinafter described, will be guided thereover in a straight line after leaving the angularly adjustable pulleys 23.

The booms 19 and 20 are supported in their spread or extended positions by means of struts or brace members 30 and 31, respectively. The strut or control member 30 is pivoted at 32 at its outer end to the boom 19 and the strut 31 is pivoted at its outer end at 33 to the boom 20. The supporting connections for the inner end of each strut 30 and 31 are alike comprising a horizontal shaft 34 by means of which each strut is pivoted to a bracket 35 swiveled through the medium of a vertical shaft or pin 36 to a cross-head comprising a pair of vertically spaced plates 37 between which the brackets are free to swing. These plates are rigidly held in spaced relation by transverse channels similar to channels 28 and the cross-head is supported on angles 38 carried by the elevator housings. The vertical pivots 36 for the brackets 35 being alined with the shafts 24 permit the struts to swing laterally with the booms when the latter are adjusted angularly by operation of the control handles 27. The pivotal connections 34 permit the struts to swing vertically as indicated by the dotted lines in Fig. 1 when the upper cross-head 26 is raised to collapse or swing the booms alongside the elevator, as also shown by the dotted lines in Fig. 1.

Rotatably mounted in the bifurcated outer ends of the booms 19 and 20 are grooved pulleys 39 and 40, respectively. A single length of operating cable 41 passes over these end pulleys and travels therebetween over the two pairs of pulleys 23 and 25. Beyond the pulley 39 there is interposed in the length of the cable a frame link 42 to which a scraper 43 is attached. The member 42 is connected by means of clevises 42a to the separated ends of the cable 41. In like manner, there is interposed in the length of the cable beyond the pulley 40 a scraper carrying frame member or link 44 to which a scraper 45 is rigidly secured. From the scraper link 42 the cable is directed inwardly toward the elevator and passes over a grooved guide pulley 46 rotatably mounted on a bracket 47 secured to the lower end of the elevator. Thence the cable passes to a grooved drum 48 upon one end of which it is wound and to which the cable is anchored at an intermediate point 49 on the drum, see Fig. 6. From the scraper link 44 the cable passes over a grooved guide pulley 50 carried by a bracket 51 and thence is wound on the opposite end of the drum. The winding drum 48 is secured to a shaft 52 which extends transversely between the elevator housings 16 and 17 from one side to the other thereof. Since the boom and scraper mechanism, above described, is duplicated at each side of the elevator, four booms and four scrapers being provided, it will be understood that duplicate winding drums 48 are mounted on opposite ends of the drum shaft 52. Fastened to one end of the shaft is a sprocket 53 driven by a sprocket chain 54 from a sprocket 55 keyed to the armature shaft of an electric motor 56 mounted on a platform 57 carried by the cross-head 37. This motor is of the reversible type and may be operated to drive the drum shaft and rotate the winding drums 48 alternately in opposite directions by suitable controls within reach of the operator. Since the scrapers 43 and 45 are linked into what is in effect a continuous cable 41 extending continuously over the booms 19 and 20 from one pair of tangential pulleys 23, 25 to the adjacent corresponding pair and wound upon a common drum 48, it will be apparent that rotation of the drum in one direction will drag one scraper from the outer end of one boom to the boot of the elevator and simultaneously drag the opposite scraper away from the elevator to a point adjacent the outer end of the other boom. Thus, the scrapers of each pair at each side of the elevator will alternately travel to and from the elevator boot when the drum shaft is driven alternately in opposite directions from the motor 56.

Figures 5, 6:
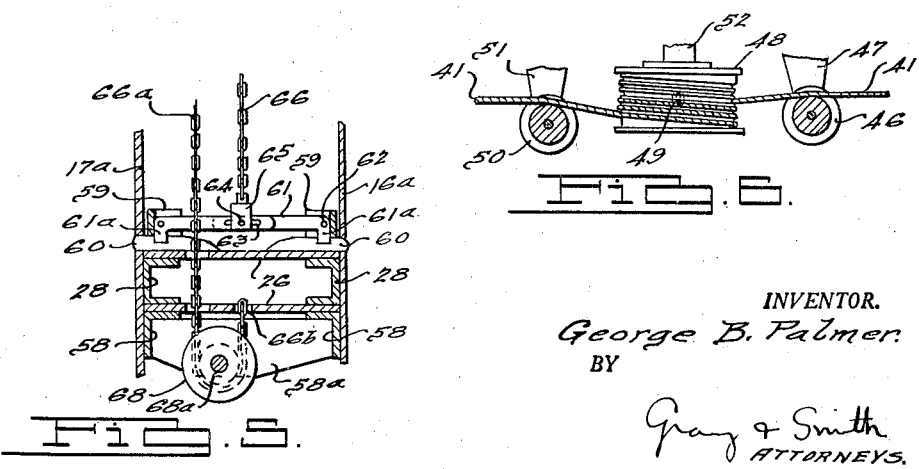
Fig. 5 is a section taken substantially through lines 5—5 of Fig. 2 looking in the direction of the arrows.
Fig. 6 is a fragmentary sectional plan view taken substantially through lines 6—6 of Fig. 4 looking in the direction of the arrows.

In accordance with the present invention mechanism is provided for raising and lowering the upper cross-head 26 and associated structure so as to swing the booms 19 and 20 inwardly toward the elevator and also for locking the cross-head in its lowered operative position, such as the position shown in Figs. 1, 4 and 5. The cross-head in its lowermost position is adapted to rest upon transverse angle bars 58 secured to the inner walls of the elevator housings and connected together by webs 58a. These angle members thus provide stops to limit the distance which the cross-head and associated structure may be lowered relative to the elevator. As illustrated in Fig. 5, a pair of oppositely slidable locking bolts 60 are guided in horizontal slots in a pair of brackets 59 extending from the cross-head 26. A pair of bell crank levers 61 cooperate with the locking bolts 60 for the purpose of shifting them into and out of locking positions. Each bell crank is pivoted at 62 to one of the brackets 59 and has a depending hook-shaped end 61a projecting within a notch in the associated locking bolt 60. The oppositely extending horizontal arms of the bell cranks 61 are overlapped and are provided with registering horizontal slots 63 through which extends a pin 64 carried by a block 65 to the upper end of which is connected a hoist chain 66 extending upwardly between the elevator housings and passing over the drum of a reversible electric power hoist 67 of any conventional type mounted a suitable distance above the operator's platform. The downward fall 66a of the chain 66 passes through apertures in the cross-head 26, around a pulley 68 and is secured at its end 66b to the cross-head, see Fig. 5. The pulley 68 is carried by a shaft 68a journalled in the webs 58a. A suitable push button control at the locality of the operator's platform 29 is provided for operating the hoist 67 so as to raise and lower the chain 66.

When in locking position the bolts 60 project through apertures in the inner side walls 16a and 17a of the elevator housings. With the cross-head supported upon the angles 58 and locked in the manner shown in Fig. 5 the locking bolts 60 may be withdrawn from the apertures by an upward pull on the chain 66 which will swing the bell cranks about their pivots 62, thereby forcing the hook-shaped ends 61a of the bell cranks inwardly and withdrawing the locking bolts from the apertures. Continued upward movement of the chain 66 as a result of operation of the power hoist will elevate the cross-head 26 and associated structure, thereby swinging the booms 19 and 20 inwardly to the dotted line positions shown at 19a and 20a in Fig. 1. As the booms are thus collapsed to their respective positions alongside the elevator, the struts 30 and 31 collapse and swing to the dotted line positions shown at 30a and 31a.

Thus, by operation of the chain hoist the upper cross-head will first be unlocked and then will be elevated along with the operator's platform and associated structure to the dotted line position shown in Fig. 1 so that with the scraper mechanism disposed in this manner the elevator may be raised or lowered through the hatch opening 11. It will be understood that when the upper cross-head is lowered until it rests upon the supporting angles 58 the weight of the block 65, when the strain on the hoisting chain 66 is relieved, will swing the bell crank levers 61 to their positions shown in Fig. 5 thus projecting the locking bolts 60 through the apertures in the side walls of the housings and locking the cross-head as well as the inner ends of the booms 19 and 20 in fixed positions with respect to the elevator.

It will be seen from the arrangement of the four booms and scrapers, illustrated in Fig. 2, that the entire area surrounding the elevator housings 16 and 17 may be served from substantially one predetermined position of the elevator within the hold. The operator may swing any one of the booms by means of the control handle 27 through an arc sufficient to enable the associated scraper to cover or serve at least one-fourth of the area around the elevator. Since in every angular adjustment of each boom the guide pulley or sheave 23 remains tangential to the associated guide pulley 25, the cable 41 will at all times pass smoothly from one boom 19 to the adjacent boom 20 over the pairs of pulleys 23 and 25. Hence, upon rotation of the winding drum 48 in either direction the cable to which the scrapers 43 and 45 are attached will shift in one direction or the other over the various pulleys or sheaves with a minimum of frictional resistance and without cramping the cable. The operation of the reversible electric motor 56 will, of course, be such that the winding drums 48 at opposite ends of the drum shaft 52 will rotate successively in opposite directions the desired number of turns so as to take up the length of the cable between the guide pulleys 46, 50 and the scrapers when in their outermost positions. During this operation, as the scrapers 43 and 45 of each pair move outwardly and inwardly in alternate manner, the operator may control the area served by each scraper independently of any other scraper by simply adjusting the particular control handle 27 so as to adjust the boom angularly in a horizontal direction, and this adjustment of the boom may be accomplished without in any way interfering with the operation of the scraper.

I claim:

1. In a material handling apparatus, an upright supporting frame, a plurality of arms adapted to extend outwardly from the frame, means shiftable on the frame for hingedly mounting said arms to swing about horizontal and vertical axes, a scraper for each arm, means for raising and lowering the inner ends of the arms to move the outer ends thereof toward and from the frame, means for swinging the arms horizontally, and means associated with the arms for shifting the scrapers toward and from the frame.

2. In a material handling apparatus, an upright supporting frame, a plurality of arms adapted to extend outwardly from the frame, means shiftable on the frame for hingedly mounting said arms to swing about horizontal and vertical axes, a scraper for each arm means for raising and lowering the inner ends of the arms to move the outer ends thereof toward and from the frame, means for independently swinging each arm in a lateral direction, and means for supporting each scraper on an arm.

3. In a material handling apparatus, an upright supporting frame, an upper cross-head shiftable vertically, a lower cross-head fixed to the frame, an arm adapted to extend outwardly from one side of the frame, a scraper supported by said arm, a strut extending from the lower cross-head to an intermediate portion of the arm and hinged to the latter, and connecting means between the inner end of the arm and the upper cross-head permitting the arm to swing vertically and horizontally relatively to the frame.

4. In a material handling apparatus, an upright supporting frame, an upper cross-head shiftable vertically on the frame, a lower cross-head fixed to the frame, an arm adapted to extend outwardly from one side of the frame, a scraper supported by said arm, a strut extending from the lower cross-head to an intermediate portion of the arm and hinged to the latter, and connecting means between the inner end of the arm and the upper cross-head and between the strut and the lower cross-head permitting the arm and strut to swing in unison vertically and horizontally relatively to the frame.

5. In a material handling apparatus, an upright supporting frame, a series of four arms adapted to extend outwardly from the sides of said frame, a scraper supported by each arm, means for pivotally mounting each arm on the frame to swing about horizontal and vertical axes, means for swinging each arm relatively to another arm in a lateral direction, and means for simultaneously raising and lowering the inner ends of the arms in any laterally adjusted position thereof to swing the outer ends thereof toward and from said frame.

6. In a material handling apparatus, an upright supporting frame, a series of four arms adapted to extend outwardly from the sides of said frame, means slidable on the frame for pivotally mounting each arm on the frame to swing in a horizontal direction, means for simultaneously raising and lowering the inner ends of the arms to swing the outer ends thereof toward and from said frame, a scraper carried by each arm, and cable mechanism for shifting said scrapers toward and from the frame relatively to said arms.

7. In a material handling apparatus, an upright supporting frame, two pairs of booms, the booms of each pair adapted to extend outwardly from opposite sides of the frame, means shiftable vertically on the frame for hingedly supporting said booms, means for raising and lowering the inner ends of the booms, a scraper for each boom, and cable mechanism common to each pair of booms and supported thereby for shifting the scrapers for each pair of booms toward and from the frame and one of each pair in a direction opposite to the other.

8. In a material handling apparatus, an upright supporting frame, two pairs of booms, the booms of each pair adapted to extend outwardly from opposite sides of the frame, means shiftable vertically on the frame for hingedly supporting said booms, means for raising and lowering the inner ends of the booms, means for swinging the booms laterally, a scraper for each boom, and cable mechanism common to each pair of booms and supported thereby for shifting the scrapers for each pair of booms toward and from the frame and one of each pair in a direction opposite to the other.

9. In a material handling apparatus, an upright supporting frame, a pair of booms adapted to extend outwardly from the frame and pivotally connected to the latter adjacent their inner ends, means on the frame for swinging said booms alongside the frame, means on the frame for swinging the booms laterally, a scraper for each boom, cable mechanism common to said booms and supported thereby and also connected to the scrapers, and winding means on the frame adjacent the inner ends of the booms for operating said cable mechanism to shift said scrapers toward and from the frame and one in a direction opposite to the other.

10. In a material handling apparatus, an upright supporting frame, a pair of booms pivotally connected to the frame and adapted to extend outwardly therefrom, a scraper for each boom, a cable common to the booms and connected to both scrapers, guide means for guiding the cable from the inner end of one boom to the inner end of the other, and a winding drum on said frame adjacent the pivotal connections of the booms to the frame for winding and unwinding the cable to shift the scrapers toward and from the frame.

11. In a material handling apparatus, an upright supporting frame, a pair of booms pivotally connected to the frame and adapted to extend outwardly therefrom, means on the frame for swinging the booms alongside the frame, a scraper for each boom, a cable common to the booms and connected to both scrapers, guide means for guiding the cable from the inner end of one boom to the inner end of the other, and a winding drum on said frame for winding and unwinding the cable to shift the scrapers toward and from the frame.

12. In a material handling apparatus, an upright frame, a pair of booms pivotally connected to the frame and adapted to extend outwardly therefrom, a scraper for each boom, winding mechanism on said frame, cable means guided on each boom and extending continuously from one boom to the other, said cable means being connected in its length to the scrapers and being wound on said mechanism, and means for operating said mechanism to cause said cable means to shift the scrapers in opposite directions between said frame and the outer ends of the booms.

13. In a material handling apparatus, an upright frame, a pair of booms pivotally connected to the frame and adapted to extend outwardly therefrom, a scraper for each boom, winding mechanism on said frame, cable means guided on each boom and extending continuously from one boom to the other, said cable means being connected in its length to the scrapers and being wound on said mechanism, means for operating said mechanism to cause said cable means to shift the scrapers in opposite directions between said frame and the outer ends of the booms, and means on said frame for independently adjusting said booms laterally.

14. In a material handling apparatus, an upright frame, a pair of booms pivotally connected to the frame and adapted to extend outwardly therefrom, a scraper for each boom, winding mechanism on said frame, cable means guided on each boom and extending continuously from one boom to the other, said cable means being connected in its length to the scrapers and being wound on said mechanism, means for operating said mechanism to cause said cable means to shift the scrapers in opposite directions between said frame and the outer ends of the booms, means on said frame for swinging the booms alongside the frame, and means on said frame for swinging the booms laterally.

15. In a material handling apparatus, an upright frame, a pair of booms pivotally connected to the frame and adapted to extend outwardly therefrom, a scraper for each boom, winding mechanism on said frame, cable means guided on each boom and extending continuously from one boom to the other, said cable means being connected in its length to the scrapers and being wound on said mechanism, means for operating said mechanism to cause said cable means to shift the scrapers in opposite directions between said frame and the outer ends of the booms, means on said frame for independently adjusting said booms laterally, and guide means on the frame between the inner ends of the booms positioned to guide the cable means from the inner end of one boom to the other in any laterally adjusted positions of the booms.

16. In a material handling apparatus, an upright frame, a pair of booms adapted to extend outwardly from the frame and each having a universal connection with the frame to permit the boom to be swung vertically and horizontally, a scraper for each boom, a winding drum on said frame, cable means guided on each boom and connected to each scraper, guide pulley means interposed between the inner ends of the booms and over which the cable means passes from one boom to the other, said cable means extending tangentially to said pulley means in all horizontally adjusted positions of the booms, and means for operating the drum to wind the cable means thereon and thereby shift said scrapers in opposite directions between said frame and the outer ends of the booms.

17. In a material handling apparatus, an upright frame, a pair of booms adapted to extend outwardly from the frame and each having a universal connection with the frame to permit the boom to be swung vertically and horizontally, mounting means for said universal connections shiftable vertically on said frame, a scraper for each boom, a winding drum, cable means guided on each boom and connected to each scraper, guide pulley means interposed between the inner ends of the booms and over which the cable means passes from one boom to the other, said cable means extending tangentially to said pulley means in all horizontally adjusted positions of the booms, means for operating the drum to wind the cable means thereon and thereby shift said scrapers in opposite directions between said frame and the outer ends of the booms, means for raising and lowering the inner ends of the booms to swing the booms alongside the frame and to spread the booms, and means controlled by said raising and lowering means for locking the inner ends of the booms to the frame in their spread position.

18. In a material handling apparatus, an upright supporting frame, a pair of arms extending from opposite sides of said frame, means shiftable vertically on the frame for pivotally supporting the inner ends of said arms, a scraper for each arm, a pair of struts each pivotally supported adjacent its inner end on the frame and hingedly connected at its outer end to one of said arms intermediate the ends of the latter, mechanism for shifting said means to raise the inner ends of said arms and swing the struts upwardly thereby to position the arms and struts alongside the frame, and mechanism associated with said arms for shifting said scrapers toward and from said frame.

19. In a material handling apparatus, an upright supporting frame, a pair of arms extending from opposite sides of said frame, means shiftable vertically on the frame for pivotally supporting the inner ends of said arms, a scraper for each arm, a pair of struts each pivotally supported adjacent its inner end on the frame and hingedly connected at its outer end to one of said arms intermediate the ends of the latter, means for swinging said arms laterally, mechanism for shifting said means to raise the inner ends of said arms and swing the struts upwardly thereby to position the arms and struts alongside the frame, and mechanism associated with said arms for shifting said scrapers toward and from said frame.

20. In a material handling apparatus, an upright supporting frame, a pair of arms extending from opposite sides of said frame, means shiftable vertically on the frame for pivotally supporting the inner ends of said arms, a scraper for each arm, a pair of struts each pivotally supported adjacent its inner end on the frame and hingedly connected at its outer end to one of said arms intermediate the ends of the latter, means for swinging each arm laterally and independently of the other arm, mechanism for shifting said means to raise the inner ends of said arms and swing the struts upwardly thereby to position the arms and struts alongside the frame, and mechanism associated with said arms for shifting said scrapers toward and from said frame.

21. In a material handling apparatus, an upright supporting frame, a pair of arms extending from opposite sides of said frame, means shiftable vertically on the frame for pivotally supporting the inner ends of said arms, a scraper for each arm, a pair of struts each pivotally supported adjacent its inner end on the frame and hingedly connected at its outer end to one of said arms intermediate the ends of the latter, mechanism for shifting said means upwardly to swing the arms and struts in opposite directions to position them alongside the frame, and means for supporting each scraper on an arm.

22. In a material handling apparatus, an upright supporting frame, a pair of arms extending from opposite sides of said frame, mounting means slidable on the frame for pivotally supporting the inner ends of the arms, a scraper for each arm, a pair of struts each pivotally supported adjacent its inner end on the frame and hingedly connected at its outer end to one of said arms intermediate the ends of the latter, means for raising and lowering the inner ends of the arms, means for mounting the inner ends of the arms to swing horizontally, and means associated with the arms for shifting the scrapers toward and from the frame.

GEORGE BRUCE PALMER.

REFERENCES CITED

The following references are of record in the file of this patent:

UNITED STATES PATENTS

| Number | Name | Date |
| --- | --- | --- |
| 183,015 | Milsom | Oct. 10, 1876 |
| 188,924 | Mann | Mar. 27, 1877 |
| 351,805 | Service | Nov. 2, 1886 |
| 707,491 | Acklin | Aug. 19, 1902 |
| 732,571 | Leonard | June 30, 1903 |
| 769,923 | Sheehan et al. | Sept. 13, 1904 |
| 969,164 | Johnstone | Sept. 6, 1910 |
| 1,034,366 | Hutto | July 30, 1912 |
| 1,177,049 | Peterson | Mar. 28, 1916 |
| 1,243,293 | Hoenecke | Oct. 16, 1917 |
| 1,346,681 | Pratt | July 13, 1920 |
| 1,441,216 | Corner | Jan. 9, 1923 |
| 1,626,984 | Sundberg | May 3, 1927 |
| 2,110,737 | Palmer | Mar. 8, 1938 |
| 2,194,706 | Litter | Mar. 26, 1940 |
| 2,219,926 | Jensen | Oct. 29, 1940 |